US008111160B2

(12) United States Patent
Bove

(10) Patent No.: US 8,111,160 B2
(45) Date of Patent: Feb. 7, 2012

(54) LIGHT ENABLED RFID CARD

(75) Inventor: John M. Bove, San Carlos, CA (US)

(73) Assignee: Lasercard Corporation, Mountain View, CA (US)

( * ) Notice: Subject to any disclaimer, the term of this patent is extended or adjusted under 35 U.S.C. 154(b) by 1225 days.

(21) Appl. No.: 11/830,511

(22) Filed: Jul. 30, 2007

(65) Prior Publication Data
US 2012/0000985 A1    Jan. 5, 2012

(51) Int. Cl.
*G08B 21/00* (2006.01)
(52) U.S. Cl. .................. 340/572.1; 340/10.1; 340/539.1
(58) Field of Classification Search ............... 340/572.1, 340/10.1, 539.1, 539.11, 539.3, 539.26
See application file for complete search history.

(56) References Cited

U.S. PATENT DOCUMENTS

| 5,991,138 | A | 11/1999 | Sklar et al. |
| 6,278,413 | B1 | 8/2001 | Hugh et al. |
| 7,071,824 | B2 | 7/2006 | Trosper |
| 2003/0002794 | A1 | 1/2003 | Ramachandran |
| 2004/0010449 | A1 | 1/2004 | Berardi et al. |
| 2004/0049451 | A1 | 3/2004 | Berardi et al. |
| 2005/0083201 | A1 | 4/2005 | Trosper |
| 2005/0165695 | A1 | 7/2005 | Berardi et al. |
| 2006/0261950 | A1 | 11/2006 | Arneson et al. |

*Primary Examiner* — Jeffery Hofsass
(74) *Attorney, Agent, or Firm* — Sheridan Ross P.C.

(57) ABSTRACT

A radio frequency identification (RFID) card having an antenna configured to transmit data wirelessly to a remote receiver and an integrated circuit configured to transmit the data through the antenna to the remote receiver. The integrated circuit includes a transmitter section and a memory section. The memory section is configured to store the data. A power generating device is configured to supply power to the integrated circuit and a light-sensitive switch is interposed between one or more portions of the RFID card. The light-sensitive switch is configured to provide electrical coupling between the one or more portions of the RFID card when light is incident on the switch.

26 Claims, 2 Drawing Sheets

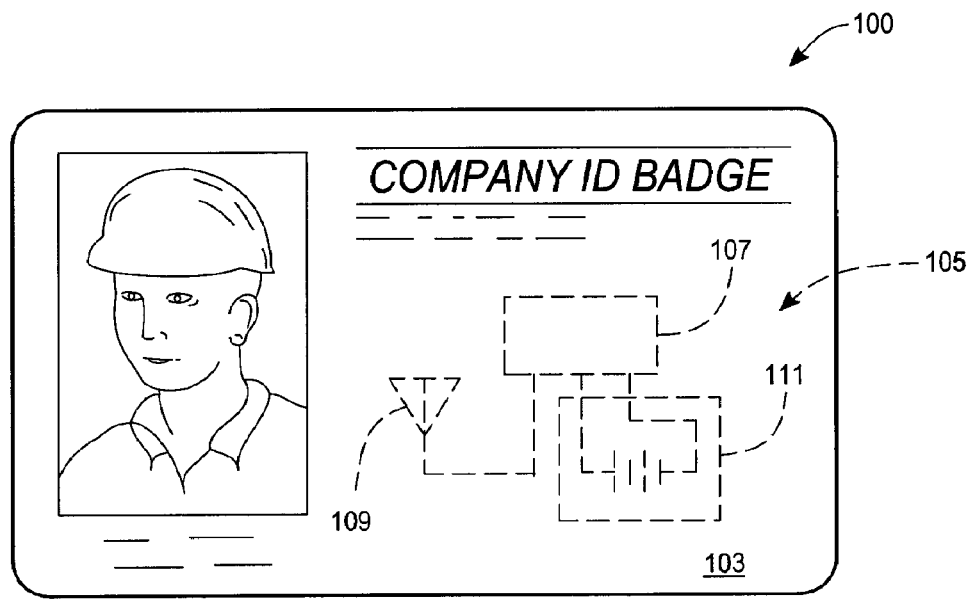
Fig. _ 1 (Prior Art)
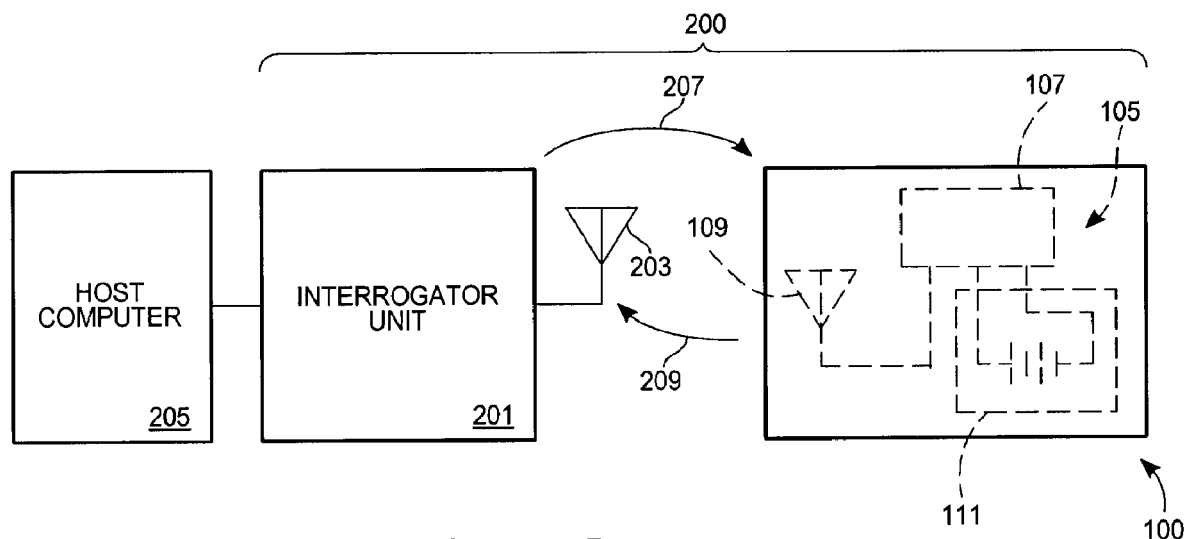
Fig. _ 2 (Prior Art)

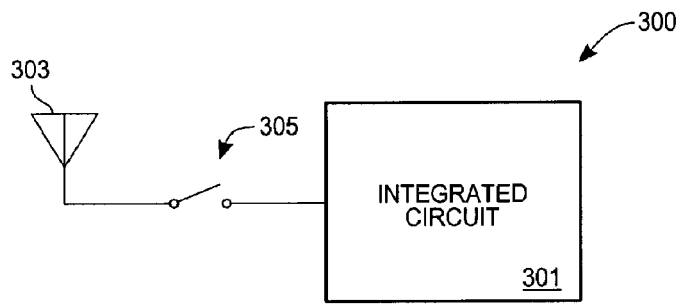
*Fig._ 3A*
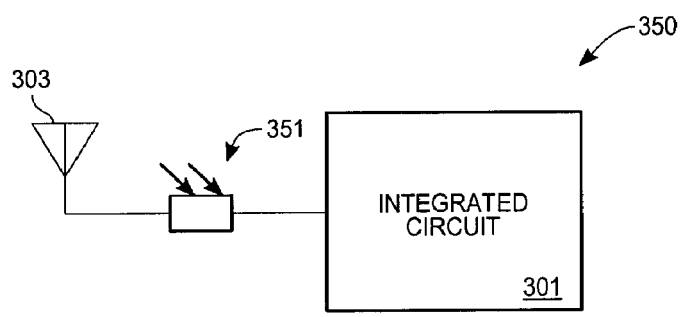
*Fig._ 3B*
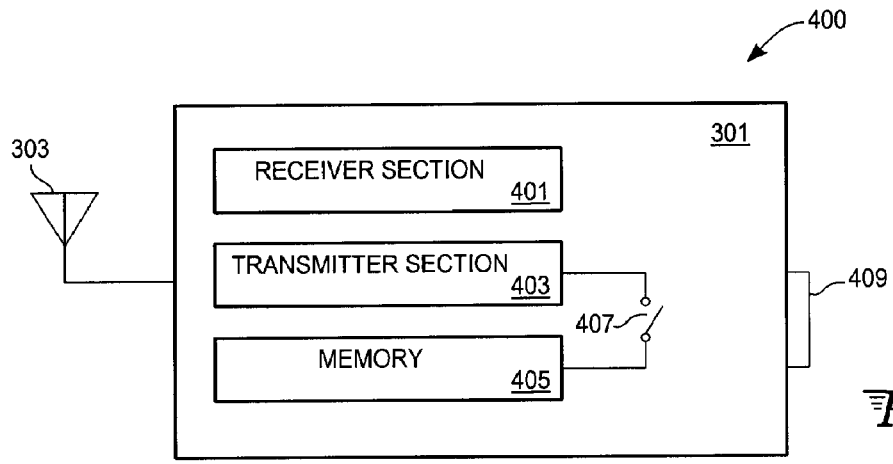
*Fig._ 4*
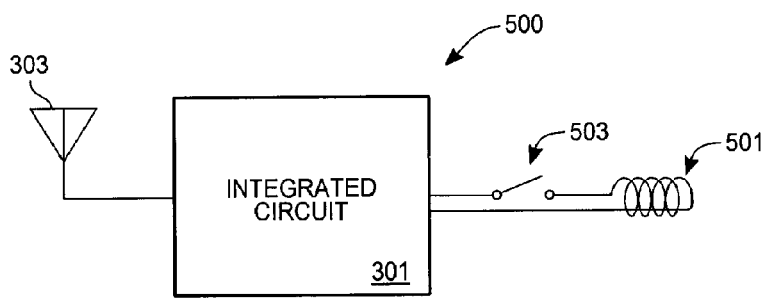
*Fig._ 5*

LIGHT ENABLED RFID CARD

TECHNICAL FIELD

The present invention relates generally to portable identity or transactional data storage cards, and more particularly, to producing a secure radio frequency identification (RFID) card.

BACKGROUND

Wireless communication systems including electronic identification devices, such as radio frequency identification device (RFID) cards, are known in the art. RFID cards frequently include a unique serial number permanently and unalterably burned into an integrated circuit contained within the card. The integrated circuit typically has sufficient memory capacity for data (e.g., electronically or optically stored) such as a card issuer identification (ID) number, user information (name, account number, signature image, etc.), the private key of a public-private key pair, a digital signature, and a personal identification number (PIN).

Wireless communication systems employ an RF transponder device to which an interrogator transmits an interrogation signal. If within range, the device receives the signal then generates and transmits a responsive signal. In the case of an active device having an on-board power source, close proximity to an interrogator or reader is not required.

With reference to FIG. 1, an RFID card 100 of the prior art includes a plastic housing card 103 and a radio frequency communication device 105. The radio frequency communication device 105 includes an integrated circuit 107, at least one antenna 109 connected to the integrated circuit 107 for radio frequency transmission and reception of data to and from the integrated circuit 107, and a power source 111 to supply power to the integrated circuit 107. The integrated circuit 107 includes receiver and transmitter sections (not shown). The power source 111 is a battery or other suitable power source. Alternatively, the power source 111 may not be physically present within the plastic housing card 103. In such cases, the radio frequency communication device 105 derives power inductively when in proximity to an interrogator unit, described below.

Various configurations are possible for the antenna 109. In the RFID card 100 of the prior art, the antenna 109 is shared by the receiver and transmitter sections of the integrated circuit 107. The antenna 109 is frequently formed by conductive epoxy screened onto or within laminations of the plastic housing card 103. The antenna 109 typically comprises a folded dipole antenna defining a continuous conductive path, or loop, of microstrip. A microstrip is a thin, flat electrical conductor separated from a ground plane by a layer of insulation or an air gap. Alternatively, the antenna 109 can be constructed as a continuous loop antenna.

In FIG. 2, a radio frequency communication system 200 of the prior art includes the RFID card 100 and a radio frequency interrogator unit 201. The RFID card 100 transmits and receives radio frequency communications to and from the interrogator unit 201. The interrogator unit 201 is ordinarily a large, stationary unit and includes an antenna 203 as well as dedicated transmitting and receiving circuitry, similar to that implemented on the integrated circuit 107 of the RFID card 100. The radio frequency communication system 200 further includes a host computer 205 in communication with the interrogator unit 201. The host computer 205 acts as a master in a master-slave relationship with the interrogator unit 201. The host computer 205 typically includes an applications program for controlling the interrogator unit 201 and interpreting responses. Further, the host computer 205 frequently contains a library of radio frequency identification device applications or functions. The functions affect radio frequency communication between the interrogator unit 201 and the RFID card 100.

Generally, the antenna 203 transmits an interrogation signal 207. The RFID card 100 receives the incoming interrogation signal via the antenna 109. Upon receiving the signal 207, the RFID card 100 responds by generating and transmitting a responsive signal 209. The responsive signal 209 is encoded with information that uniquely identifies or labels the RFID card 100 that is transmitting, thereby identifying any object or person with which the RFID card 100 is associated.

However, a plurality of RFID cards (not shown) could simultaneously be within the interrogative field of the interrogator unit 201 (i.e., within communications range of the interrogator unit 201). Additionally, one or more RFID cards may simply be passing by in range of the interrogator unit 201. As soon as any RFID card comes within range of the interrogator unit 201, communications may be initiated, perhaps surreptitiously. As distance ranges for reading of RFID cards are ever increasing, the problem with wrongful card reading becomes increasingly problematic. For example, a person carrying an RFID card in a wallet or purse may unknowingly come within range of an interrogator and communications may be initiated unknowingly. As communications is initiated, an unscrupulous malefactor may intercept data contained on the RFID card. Therefore, what is needed is a simple and effective means of preventing unknowing and unwanted communications between an RFID card and an interrogator unit.

SUMMARY OF THE INVENTION

In one exemplary embodiment, the invention is a radio frequency identification (RFID) card having an antenna configured to transmit data wirelessly to a remote receiver and an integrated circuit configured to store the data. The integrated circuit is further configured to transmit the data through the antenna to the remote receiver. A light-sensitive switch is interposed between the antenna and the integrated circuit. The light-sensitive switch is configured to allow electrical communication between the antenna and integrated circuit when light is incident on the switch.

In another exemplary embodiment, the invention is a radio frequency identification (RFID) card having an antenna configured to transmit data wirelessly to a remote receiver and an integrated circuit configured to transmit the data through the antenna to the remote receiver. The integrated circuit also has a transmitter section and a memory section. The memory section is configured to store the data. A light-sensitive switch is interposed between the memory section and the transmitter section. The light-sensitive switch is configured to allow electrical communication between the memory section and the transmitter section when light is incident on the switch.

In another exemplary embodiment, the invention is a radio frequency identification (RFID) card having an antenna configured to transmit data wirelessly to a remote receiver and an integrated circuit configured to store the data. The integrated circuit is further configured to transmit the data through the antenna to the remote receiver. A power generating device is configured to supply power to the integrated circuit. A light-sensitive switch is interposed between the power generating device and the integrated circuit. The light-sensitive switch is configured to allow electrical power to pass between the power generating device and integrated circuit when light is incident on the switch.

In another exemplary embodiment, the invention is a radio frequency identification (RFID) card having an antenna configured to transmit data wirelessly to a remote receiver and an integrated circuit configured to transmit the data through the antenna to the remote receiver. The integrated circuit also includes a transmitter section and a memory section. The memory section is configured to store the data. A power generating device is configured to supply power to the integrated circuit and a light-sensitive switch is interposed between one or more portions of the RFID card. The light-sensitive switch is configured to provide electrical coupling between the one or more portions of the RFID card when light is incident on the switch.

BRIEF DESCRIPTION OF THE DRAWINGS

FIG. 1 is an RFID card of the prior art.

FIG. 2 is a diagrammatic representation of communications of the prior art RFID card of FIG. 1 within a radio frequency communication system.

FIG. 3A is a schematic representation of a switched antenna in accordance with an embodiment of the present invention.

FIG. 3B is a schematic representation of a switched antenna in accordance with another embodiment of the present invention.

FIG. 4 is a schematic representation of a switched memory storage device in accordance with an embodiment of the present invention.

FIG. 5 is a schematic representation of a switched power supply in accordance with an embodiment of the present invention.

DETAILED DESCRIPTION

In order to prevent unknown and unwanted communications with an RFID card, various embodiments described herein utilize different configurations of one or more optoelectronic switching devices to prevent communications unless an RFID card user deliberately initiates a communications session. As described in detail below, various types of light-sensitive switching devices may be placed in one or more locations within an RFID card to prevent communications while the card is carried in, for example, a user's purse or wallet. Removing the card from the user's purse or wallet allows light to strike the card, thereby enabling communications.

With reference to FIG. 3A, an exemplary embodiment of a radio frequency communication device portion 300 of an RFID card includes an integrated circuit 301, an antenna 303, and a light-sensitive switch 305. The light-sensitive switch 305 is located between the integrated circuit 301 and the antenna 303, thereby preventing any information from being transmitted by the card unless the light-sensitive switch 305 is closed. The light-sensitive switch 305 thus disables communications unless light is incident on the switch 305.

In some embodiments, the light-sensitive switch 305 is not a physical mechanical switch but is merely representational of various types of optoelectronic switching devices which may be employed. Such optoelectronic switching devices include, for example, photoresistors (i.e., light-dependent resistors (LDRs) or photoconductors), cadmium sulfide (CdS) cells, photodiodes, phototransistors, and similar devices known in the art. Attributes of some optoelectronic switching devices are described in more detail, below.

In operation, the light-sensitive switch 305 of an RFID card remains open (i.e., it will not conduct electricity) until being exposed to light. Thus, an RFID card user would simply expose the card to light thereby allowing communications to occur. To prevent communications, the RFID card is placed in the user's purse or pocket, thus blocking the light and opening the light-sensitive switch, thereby disabling any transmission.

In FIG. 3B, the light-sensitive switch 305 (FIG. 3A) has been replaced with a photoelectric device 351, such as a photoresistor, in a radio frequency communication device portion 350 of an RFID card. Photoresistor devices are fabricated from ordinarily high-resistance semiconductor devices known in the art. The device operates by having a resistance which decreases with increased light intensity incident upon the device. Incident light causes photons absorbed by the semiconducting device to impart sufficient energy to electrons to move from the valence band into the conduction band. Thus, resulting free electrons conduct electricity, subsequently lowering device resistance.

In general, the light-sensitive switch 305 of FIG. 3A can be any type of photoelectric device. The photoelectric device can be fabricated from either an intrinsic or an extrinsic semiconductor. In intrinsic semiconductor devices, electrons are in the valence band. A photon incident on the device must impart sufficient energy to excite an electron across the device bandgap. In contrast, extrinsic semiconductor devices have added impurities. The added impurities allow a ground state energy closer to the conduction band, resulting in a smaller bandgap. The smaller bandgap allows lower energy photons (e.g., photons with longer wavelengths) to impart sufficient energy to move electrons into the conduction band, resulting in a reduced device resistance. Since bandgaps can be tailored to some extent by dopant type and dopant density, devices may be fabricated with some wavelength dependency. Thus, an RFID card may be fabricated so as to be activated only by particular bands or wavelengths of light. Alternatively, the RFID card may be fabricated to be responsive only to a narrow bandwidth or range of light by placing optical filters (not shown) over the light-sensitive switch 305.

Cadmium sulfide cells rely on material properties of the compound material itself to vary inherent resistance levels depending upon a quantity of light incident on the cell. Generally, as an incident light level increases, the resistance of the cell decreases. Resistance levels of CdS cells can range from less than 100 ohms in bright light to greater than 10 megohms in a darkened area. Photodiodes are semiconductor devices that function as a photodetector. Photodiodes may be packaged with a window or optical filter to allow wavelength-dependent activation.

Phototransistors are bipolar transistors encased in a transparent or translucent case allowing light to reach a base-collector junction of the transistor. Phototransistors are more sensitive to light than photodiodes since photon-excited electrons in the base-collector junction are amplified prior to being output by the emitter. Photodiodes and phototransistors can each be fabricated from various elemental and compound semiconductors (e.g., silicon, germanium, indium gallium arsenide). Each of the various semiconductors has a particular bandpass region in which operation of the device occurs. Thus, the material type employed may be combined with impurity levels and types as well as optical filters in order to tune specific wavelength ranges under which the RFID card will operate. A skilled artisan will recognize how these various effects may be advantageously combined to produce RFID cards operable in particular environments and varying levels of required security.

In FIG. 4, a radio frequency communication device portion 400 of an exemplary RFID card includes the integrated circuit 301 of FIG. 3A. In this embodiment, the integrated circuit 301 includes a receiver section 401, a transmitter section 403, and a memory section 405. The transmitter section 403 receives data from the memory section 405 via, for example, a bus line (not shown explicitly). However the data must pass through a light-sensitive switch 407. If the RFID card is in the user's pocket or purse, no data can travel from the memory section 405 to the transmitter section 403. Thus, unless light is incident on the light-sensitive switch 407, no data can be transmitted inadvertently. An optional window or optical filter 409 permits only a particular bandwidth of light wavelengths to fall upon the light-sensitive switch 407 as described above.

With reference to FIG. 5, a radio frequency communication device portion 500 of an RFID card includes a power generating device 501 and a light-sensitive switch 503. The power generating device 501 may be a battery or other type of power supply. Alternatively, the power generating device 501 may be a coil in which power is induced as the RFID card comes in proximity of an interrogation device. The light-sensitive switch 503 functions similarly to the light-sensitive switch 407 (FIG. 4). However, the light-sensitive switch 503 provides a pathway by which power is supplied to the integrated circuit 301. If no light is incident upon the light-sensitive switch 503, the integrated circuit 301 is not supplied with power and thus remains inactive.

Alternatively, the power generating device 501 may be integral with the light-sensitive switch 503. For example, photodiodes, described above, will function under either a zero bias condition (i.e., a photovoltaic mode) or a reverse bias condition (i.e., a photoconductive mode). In a photovoltaic mode, light incident on the diode produces a current across the device. The produced current leads to a forward bias condition in which a dark current is induced in a direction opposite that of the photocurrent. In this mode of operation, the "switch" is the power generating device. The photodiode functions as a solar cell supplying power to the integrated circuit 301 whenever the photodiode is exposed to light.

In the foregoing specification, the present invention has been described with reference to specific embodiments thereof. It will, however, be evident to a skilled artisan that various modifications and changes can be made thereto without departing from the broader spirit and scope of the present invention as set forth in the appended claims. For example, all embodiments described utilize a light-sensitive device. However, a skilled artisan will recognize that the light-sensitive device need not be responsive to only wavelengths within the visible spectrum. The devices may be fabricated such that they are activated by, for example, infrared or ultraviolet sources as well. Such sources may be attached to interrogation units in the form of lasers or broadband sources with appropriate bandpass filters. Further, light-sensitive devices may be indirectly linked to an antenna or integrated circuit by controlling, for example, the gate of a transistor which in turn controls communications and/or power pathways. Also, various combinations of embodiments described herein may be employed. Therefore, these and various other embodiments are all within a scope of the present invention. The specification and drawings are, accordingly, to be regarded in an illustrative rather than a restrictive sense.

What is claimed is:

1. A radio frequency identification (RFID) card comprising:
   an antenna configured to transmit data wirelessly to a remote receiver;
   an integrated circuit configured to store the data, the integrated circuit being further configured to transmit the data through the antenna to the remote receiver; and
   a light-sensitive switch interposed between the antenna and the integrated circuit, the light-sensitive switch configured to allow electrical communication between the antenna and integrated circuit when light is incident on the switch.

2. The radio frequency identification (RFID) card of claim 1 further comprising an optical filter placed over the light-sensitive switch.

3. The radio frequency identification (RFID) card of claim 2 wherein the optical filter is a bandpass filter, the bandpass filter arranged to pass a particular wavelength range of light.

4. The radio frequency identification (RFID) card of claim 1 wherein the light-sensitive switch is a photoresistor.

5. The radio frequency identification (RFID) card of claim 1 wherein the light-sensitive switch is a photodiode.

6. The radio frequency identification (RFID) card of claim 1 wherein the light-sensitive switch is a phototransistor.

7. The radio frequency identification (RFID) card of claim 1 wherein the light-sensitive switch is a cadmium sulfide cell.

8. A radio frequency identification (RFID) card comprising:
   an antenna configured to transmit data wirelessly to a remote receiver;
   an integrated circuit configured to transmit the data through the antenna to the remote receiver, the integrated circuit having a transmitter section and a memory section, the memory section being configured to store the data; and
   a light-sensitive switch interposed between the memory section and the transmitter section, the light-sensitive switch configured to allow electrical communication between the memory section and the transmitter section when light is incident on the switch.

9. The radio frequency identification (RFID) card of claim 8 further comprising an optical filter placed over the light-sensitive switch.

10. The radio frequency identification (RFID) card of claim 9 wherein the optical filter is a bandpass filter, the bandpass filter arranged to pass a particular wavelength range of light.

11. The radio frequency identification (RFID) card of claim 8 wherein the light-sensitive switch is a photoresistor.

12. The radio frequency identification (RFID) card of claim 8 wherein the light-sensitive switch is a photodiode.

13. The radio frequency identification (RFID) card of claim 8 wherein the light-sensitive switch is a phototransistor.

14. The radio frequency identification (RFID) card of claim 8 wherein the light-sensitive switch is a cadmium sulfide cell.

15. A radio frequency identification (RFID) card comprising:
   an antenna configured to transmit data wirelessly to a remote receiver;
   an integrated circuit configured to store the data, the integrated circuit being further configured to transmit the data through the antenna to the remote receiver;
   a power generating device configured to supply power to the integrated circuit; and a light-sensitive switch interposed between the power generating device and the integrated circuit, the light-sensitive switch configured to allow electrical power to pass between the power generating device and integrated circuit when light is incident on the switch.

16. The radio frequency identification (RFID) card of claim 15 further comprising an optical filter placed over the light-sensitive switch.

17. The radio frequency identification (RFID) card of claim 16 wherein the optical filter is a bandpass filter, the bandpass filter arranged to pass a particular wavelength range of light.

18. The radio frequency identification (RFID) card of claim 15 wherein the light-sensitive switch is a photoresistor.

19. The radio frequency identification (RFID) card of claim 15 wherein the light-sensitive switch is a photodiode.

20. The radio frequency identification (RFID) card of claim 15 wherein the light-sensitive switch is a phototransistor.

21. The radio frequency identification (RFID) card of claim 15 wherein the light-sensitive switch is a cadmium sulfide cell.

22. The radio frequency identification (RFID) card of claim 15 wherein the light-sensitive switch and the power generating device comprise a single unit such that the light-sensitive switch is a semiconductor device configured to be biased in a photovoltaic mode such that the switch generates power when exposed to light.

23. A radio frequency identification (RFID) card comprising:
- an antenna configured to transmit data wirelessly to a remote receiver;
- an integrated circuit configured to transmit the data through the antenna to the remote receiver, the integrated circuit having a transmitter section and a memory section, the memory section being configured to store the data;
- a power generating device configured to supply power to the integrated circuit; and
- a light-sensitive switch interposed between one or more portions of the RFID card, the light-sensitive switch configured to provide electrical coupling between the one or more portions of the RFID card when there is a change in light incident on the switch.

24. The radio frequency identification (RFID) card of claim 23 further comprising an optical filter placed over the light-sensitive switch.

25. The radio frequency identification (RFID) card of claim 24 wherein the optical filter is a bandpass filter, the bandpass filter arranged to pass a particular wavelength range of light.

26. The radio frequency identification (RFID) card of claim 23 wherein the light-sensitive switch and the power generating device comprise a single unit such that the light-sensitive switch is a semiconductor device configured to be biased in a photovoltaic mode such that the switch generates power when exposed to light.

* * * * *